(12) United States Patent
Groleau

(10) Patent No.: US 8,425,217 B2
(45) Date of Patent: Apr. 23, 2013

(54) METHOD FOR INSTALLING INDIRECT AND DIRECT MOLD PRESSURE, TEMPERATURE AND FLOW FRONT DETECTION SENSORS WITHOUT MACHINING THE MOLD

(76) Inventor: Rodney J. Groleau, Suttons Bay, MI (US)

( * ) Notice: Subject to any disclaimer, the term of this patent is extended or adjusted under 35 U.S.C. 154(b) by 228 days.

(21) Appl. No.: 12/655,165

(22) Filed: Dec. 23, 2009

(65) Prior Publication Data

US 2011/0151041 A1    Jun. 23, 2011

(51) Int. Cl.
*B29C 45/40* (2006.01)
*B29C 45/76* (2006.01)

(52) U.S. Cl.
USPC ...... 425/149; 249/67; 425/170; 425/436 RM; 425/444; 425/556

(58) Field of Classification Search ............... 425/139, 425/145, 149, 170, 436 RM, 444, 556, 577; 249/67; 264/40.5
See application file for complete search history.

(56) References Cited

U.S. PATENT DOCUMENTS

| | | | |
|---|---|---|---|
| 4,874,032 A * | 10/1989 | Hatamura | 164/457 |
| 5,179,857 A | 1/1993 | Sonderegger et al. | |
| 5,566,743 A * | 10/1996 | Guergov | 164/457 |
| 5,595,693 A | 1/1997 | Fujita et al. | |
| 5,733,486 A | 3/1998 | Hayasi et al. | |
| 5,846,573 A * | 12/1998 | Wurst et al. | 425/149 |
| 6,345,974 B1 * | 2/2002 | Kawasaki et al. | 425/149 |
| 6,379,141 B1 * | 4/2002 | Kawasaki et al. | 425/139 |
| 6,537,053 B1 * | 3/2003 | Watkins | 425/190 |
| 6,649,095 B2 | 11/2003 | Buja | |
| 6,872,069 B2 * | 3/2005 | Starkey | 425/556 |
| 6,929,464 B2 * | 8/2005 | Suzuki | 425/556 |
| 6,968,240 B2 | 11/2005 | Frey | |
| 7,071,712 B2 | 7/2006 | Frey et al. | |
| 7,108,424 B2 | 9/2006 | Heumann et al. | |
| 7,124,037 B2 | 10/2006 | Gardener | |
| 7,404,321 B2 | 7/2008 | Tanaka et al. | |
| 7,430,923 B2 | 10/2008 | Bader et al. | |
| 7,431,871 B2 | 10/2008 | Frey et al. | |
| 7,491,358 B2 | 2/2009 | Gernhuber et al. | |
| 2004/0071815 A1 * | 4/2004 | Chen | 425/556 |
| 2004/0084794 A1 | 5/2004 | Frey | |
| 2004/0113303 A1 | 6/2004 | Frey | |
| 2004/0131715 A1 | 7/2004 | Frey | |
| 2004/0135277 A1 | 7/2004 | Frey | |
| 2005/0031729 A1 * | 2/2005 | Hattori et al. | 425/556 |
| 2006/0104331 A1 | 5/2006 | Dreher et al. | |
| 2006/0202370 A1 | 9/2006 | Bader | |
| 2008/0033671 A1 | 2/2008 | Bader | |
| 2008/0085334 A1 * | 4/2008 | Barnett | 425/110 |
| 2008/0223144 A1 | 9/2008 | Bader | |
| 2008/0230937 A1 | 9/2008 | Bader et al. | |
| 2008/0277822 A1 * | 11/2008 | Chen et al. | 264/237 |

\* cited by examiner

*Primary Examiner* — Yogendra Gupta
*Assistant Examiner* — Emmanuel S Luk
(74) *Attorney, Agent, or Firm* — Robert L. McKellar; McKellar IP Law, PLLC

(57) ABSTRACT

A molding apparatus includes a mold cavity (26), an ejector pin (30), and a sensor (42). The ejector pin has a first surface (48) exposed to the cavity and a second surface (40) not exposed to the cavity. The sensor (42) is in communicative contact with the ejector pin second surface (40). The sensor (42) is capable of sensing pressure in a mold cavity (26) through the ejector pin (30). The molding apparatus may include a hollow ejector pin (108) with a first end (120) facing the mold cavity (26). A sensor (104) embedded in the hollow ejector pin first end (120) senses a mold cavity parameter. A signal line (112) from the sensor (104) is routed through the hollow ejector pin (108).

24 Claims, 10 Drawing Sheets

METHOD FOR INSTALLING INDIRECT AND DIRECT MOLD PRESSURE, TEMPERATURE AND FLOW FRONT DETECTION SENSORS WITHOUT MACHINING THE MOLD

FIELD OF THE INVENTION

The invention herein disclosed and claimed relates to plastic molding and, more particularly, to a method for sensing a mold cavity parameter without significantly altering the mold.

BACKGROUND OF THE INVENTION

Plastics molding is a well-known art. Plastics are typically resin, or resin-based compositions, capable of taking and holding permanent shapes when subjected to interaction with a molding apparatus. Thermoplastic resins, such as polypropylene, are one general type of plastic. A thermoplastic resin is first heated beyond its melting point in a barrel and screw mixer of a molding machine. The melted resin is then forced into an injection molding cavity. Once in the cavity, the melted resin conforms to the shape of the cavity. The cavity is then cooled to remove heat energy from the resin until it solidifies by polymeric crystallization. Once the resin solidifies, the molding cavity is opened and the completed article is removed. Thermosetting resins, such as, epoxy resin, are another general type of plastic. Thermosetting resins rely on a chemical reaction, rather than temperature, to change from liquid to solid. In an epoxy resin, two types of liquid materials are mixed and then injected into a molding cavity. The liquid epoxy resin conforms to the shape of the cavity. A chemical reaction between the two materials causes the epoxy resin to become a solid material.

Referring now to FIGS. 11A through 11D, a prior art molding apparatus is shown in cross sectional view to illustrate important aspects of a typical molding process. Referring particularly to FIG. 11A, an injection molding apparatus 300 includes a molding die of A side 304 and B side 308. The A side 304 and B side 308 are held in a press, not shown. The press is capable of forcing and holding the A side 304 and B side 308 together under pressure and of opening the molding die by forcing the A side 304 and B side 308 apart, as shown in FIG. 11B. Referring again to FIG. 11A, the press mechanically couples to the sides 304 and 308 and the die structure 212 to perform operations requiring movement of the components and application of pressure. In addition, the press conducts incoming liquid resin material and coolant to molding die sides 304 and 308 and outgoing air from the die during cavity fill. The molding apparatus 300 also includes ejector pins 320, retainer plate 324, and an ejector plate 328. The operation of these components is described below.

In the closed position, shown in FIG. 11A, the inner surfaces of the A-side 304 and B-side 308 create a mold cavity 316. During a molding cycle, liquid resin 318 is prepared by mixing and melting (if a thermoplastic) in an injection barrel, not shown. The liquid resin 318 is then injected from the barrel, through a sprue, not shown, on either the A or B sides 304 and 308. The liquid resin flows through a series of small runners, not shown, machined into the faces of the A and B sides 304 and 308. The liquid resin 318 then enters the mold cavity 316 through gates, not shown. The amount of liquid resin 318 required to fill the sprue, runners, and the molding cavity 316 is typically called a shot. As the shot of liquid resin 318 enters the mold cavity 316, air trapped in the cavity 316 escapes through small vents, not shown, ground into the parting line of the mold sides 304 and 308.

Once the mold cavity 316 has completely filled, the liquid resin 318 entirely replicates the shape of the cavity 316. This liquid resin 318 is forced into the mold cavity 316 under pressure to ensure that there are no voids. To maintain the liquid resin 318 under pressure, the sides 304 and 308 are held together under pressure. If thermoplastic resin is used, then the liquid resin 318 must be cooled to complete solidification. Cooling is typically performed by passing a coolant, such as water, through pathways, not shown, milled through the sides 304 and 308. The coolant absorbs heat from the melted resin 318 via the sides 304 and 308. Once cooling is completed, the liquid resin 318 becomes solid resin 318', as shown in FIG. 11B. If thermosetting resin is used, then the liquid resin 318 converts to solid resin 318' without cooling, and generally by heating using a liquid or electrical heating source in the mold. This heat source may be used to control the temperature of the cavity 316 during the solidification reaction.

Referring again to FIG. 11B, once the resin 318' solidifies, the mold is opened. In a typical molding apparatus, only one of the sides 304 and 308 moves. Here, the A side 304 is held in a fixed position while the B side 308 and the die structure 312, are pulled away. Typically the sides 304 and 308 are designed such that solid resin 318' easily releases from the A side 304 while being retained in the B side 308, as shown. In high speed manufacturing, removal of the solid resin 318' from the B side 308 by hand or by external mechanical apparatus is typically impractical. Rather, the solid resin 318' is pushed from the B side 308 by ejector pins 320 as shown in FIG. 11C. The ejector pins 320 are held in position by the retainer plate 324. To actuate the ejector pins 320, the molding press forces the ejector plate 328 toward the B side 308. As the ejector plate 328 moves, the ejector pins 320 slide past the cavity surface 332 of the B side 308 to support the solid resin 318'. The ejector plate 328 and ejector pins 320 are designed to push the solid resin 318' sufficiently out of the B side 308 for complete removal.

Referring now to FIG. 11D, once the solid resin 318' has been removed from the molding apparatus 300, the ejector plate 328 and ejector pins 320 are retracted such that the leading surfaces 336 of the ejector pins 320 are aligned to the B side cavity surface. The A side 304 and B side 308 are then closed to prepare for the next molding cycle.

A typical molding cycle sequence includes the steps of (1) closing the mold, (2) injecting the mold, (3) holding the injected material under pressure, (4) cooling the molded part, (5) opening the mold, and (6) ejecting the part. The overall molding cycle time is the sum of the time required to complete all of these steps. High volume manufacturing of resin-based articles requires minimizing the cycle time while producing consistent, high-quality parts. Typically, the times required to open, close, and eject the mold are short relative to the overall cycle time. Also, the mold close, open, and ejection times do not typically depend on specific mold cavity design or resin composition. However, the times required to completely inject the mold and to sufficiently cool the resin do depend on the mold cavity design and the resin composition.

Minimization of the injection and cooling times is essential for successful commercial molding. However, minimization creates a risk of scrap due to any of a variety of molding problems. For example, if liquid resin is injected too rapidly, then the molded part may exhibit burn marks, jetting, or excessive flash. Conversely, if injection is too slow, then molded part may exhibit flow marks, incomplete cavity fill (short shot), or splaying. Similarly, improper cooling may cause blistering, sink marks, or warping. An improper meltfront flow, due to poor mold design, may cause knit lines in the molded article. Efforts to minimize cooling time may worsen this problem.

Interactions between mold design, resin composition, and molding parameters—such as temperature, injection pressures, injection rates, cooling rates, screw speeds, and timing—are complex. Therefore, the plastics molder must carefully study the performance of the molding apparatus to optimize set-up to produce high-quality molded parts at optimal cycle times. Ideally, the molder would monitor the liquid resin 318 as it is injected into and flows through the mold cavity 316. However, the mold cavity 316 is buried inside an opaque block of metal. Therefore, the flow performance of the liquid resin 318 cannot be observed visually. Resin temperature and pressure are not directly accessible. Without direct observation or parametric data, the manufacturer must optimize performance by analyzing molded articles. This approach is time-consuming and ineffective.

One technique to provide molding data is to place temperature or pressure sensors directly inside the molding cavity. However, there are several problems with this approach. The presence of the sensors in the cavity must be planned in advance or extensive and costly modifications of the mold must be done after the mold is built. Frequently, the manufacturer molds plastic components for others and does not own the mold die. Further, he may be contractually prohibited from altering the molding cavity in any way. In such cases, the placement of sensors within the mold cavity, after the initial mold build, is simply not an option. A significant need exists for a method to acquire, real-time mold cavity parametric data without altering the mold components cavity.

SUMMARY OF THE INVENTION

A molding apparatus of the present invention provides a means to measure, directly and indirectly, a mold cavity parameter by sensing through an ejector pin. In one exemplary embodiment of the present invention, a molding apparatus includes a mold cavity, an ejector pin, and a sensor. The ejector pin has a first surface exposed to the cavity and a second surface not exposed to the cavity. The sensor is placed in communicative contact with the ejector pin second surface. The sensor is capable of indirectly sensing mold cavity pressure through the ejector pin.

In another exemplary embodiment of the present invention, a molding apparatus includes a mold cavity, an ejector pin, a retainer plate, an ejector plate, a spacer plate, and a sensor. The ejector pin has a first surface exposed to the cavity and a second surface not exposed to the cavity. The sensor is placed in communicative contact with the ejector pin second surface. The sensor is capable of indirectly sensing mold cavity pressure through the ejector pin. The spacer plate is held between the retainer plate and ejector plate. A die spacing plate is further included to account for the thickness of the spacer plate.

In another exemplary embodiment of the present invention, a molding apparatus includes a mold cavity, an ejector pin, an ejector plate, a clamping plate, a transfer pin, a cover plate, and a sensor. The ejector pin has a first surface exposed to the cavity and a second surface not exposed to the cavity. The transfer pin is in communicative contact with the ejector pin second surface. The transfer pin is through clearance holes in the ejector plate and clamping plate. A sensor is placed in communicative contact with the transfer pin second surface. The sensor is capable of indirectly sensing mold cavity pressure through the transfer pin.

In another exemplary embodiment of the present invention, a molding apparatus includes a mold cavity, a hollow ejector pin, and a sensor. The hollow ejector pin has a first surface end facing the mold cavity and a second end not facing to the cavity. The sensor is embedded in the hollow ejector pin first end. The sensor is exposed to the mold cavity and is capable of directly sensing a mold cavity parameter. The sensor has a signal line routed through the hollow ejector pin.

In another exemplary embodiment of the present invention, a molding apparatus includes a mold cavity, a first hollow ejector pin, a first sensor, and a second sensor. The hollow ejector pin has a first surface end facing the mold cavity and a second end not facing to the cavity. The first sensor is embedded in the hollow ejector pin first end. The first sensor is exposed to the mold cavity and is capable of directly sensing a mold cavity parameter. The sensor has a signal line routed through the hollow ejector pin. The second sensor is in communicative contact with the hollow ejector pin second surface and is capable of indirectly sensing the mold cavity pressure.

In another exemplary embodiment of the present invention, a molding apparatus includes a mold cavity, a retainer plate, an ejector plate, a clamping plate, a transfer pin, a cover plate, and a sensor. The transfer pin has a first surface exposed to the cavity through a hole in the cavity and a second surface not exposed to the cavity. The transfer pin is through the retainer plate and clearance holes in the ejector plate and clamping plate. A sensor is placed in communicative contact with a second surface of the transfer pin and is capable of indirectly sensing mold cavity pressure through the transfer pin.

In another exemplary embodiment of the present invention, a molding apparatus includes a mold cavity, a retainer plate, an ejector plate, a clamping plate, a hollow transfer pin, a cover plate, and a sensor. The hollow ejector pin has a first surface end facing the mold cavity and a second end not facing to the cavity. A sensor is embedded in the hollow ejector pin first end. The sensor is exposed to the mold cavity and is capable of directly sensing a mold cavity parameter. The hollow transfer pin is through the retainer plate and clearance holes in the ejector plate and clamping plate. The sensor has a signal line routed through the hollow transfer pin.

In another exemplary embodiment of the present invention, a molding apparatus includes a mold cavity, a retainer plate, an ejector plate, a clamping plate, a first hollow ejector pin, a first sensor, and a second sensor. The hollow ejector pin has a first surface end facing the mold cavity and a second end not facing to the cavity. The first sensor is embedded in the hollow ejector pin first end. The first sensor is exposed to the mold cavity and is capable of directly sensing a mold cavity parameter. The sensor has a signal line routed through the hollow ejector pin. The second sensor is in communicative contact with the hollow ejector pin second surface and is capable of indirectly sensing the mold cavity pressure.

In another exemplary embodiment of the present invention, a molding apparatus includes a mold cavity, an ejector plate, a clamping plate, a transfer pin, a cover plate, and a sensor. The ejector plate has a first side facing the mold cavity and a second side not facing the mold cavity. The transfer pin has a first end in communicative contact with ejector plate and is operable to stop the ejector plate. The transfer pin is through the retainer plate and clearance holes in the ejector plate and clamping plate. A sensor is placed in communicative contact with a second end of the transfer pin and is capable of indirectly sensing ejector plate pressure through the transfer pin.

The apparatus of the present invention creates several novel and unexpected advantages over the prior art. First, a parametric sensor may be added to a mold without modifying the standard mold components and only minor components such as ejector pins, spacers and fasteners might need to be replaced. Costly and complex mold modifications are avoided. Valuable parametric data is made available to the plastics molder without violating his contract. Second, sensors may be easily added or subtracted from the molding apparatus without modification of the originally designed mold components. A substantial number of sensors—equal to the number of ejector pins—may be added during manufacturing startup or during trouble-shooting. Any or all of these sensors may or may not be removed for high volume production. Other advantages will be recognized by those of ordinary skill in the art. The novel approach of the present invention allows the mold design-and-build cycle to remain unchanged. The components required for the new approach can be engineered and built simultaneously. In addition, the new method is more robust than prior art methods of adding sensors to a mold and allows easier access to the sensors for recalibration and service.

BRIEF DESCRIPTION OF THE DRAWINGS

The present invention and the corresponding advantages and features provided thereby will be best understood and appreciated upon review of the following detailed description of the invention, taken in conjunction with the following drawings, where like numerals represent like elements, in which.

DETAILED DESCRIPTION OF THE INVENTION

Figure 1A:
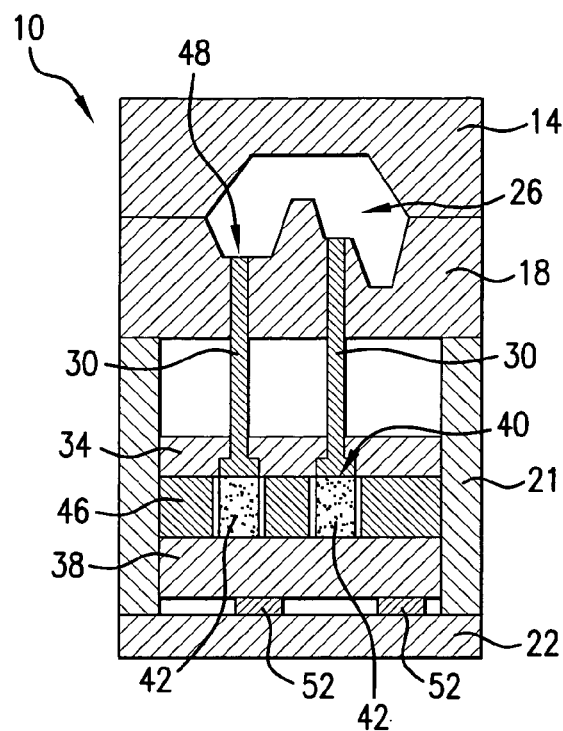
FIGS. 1A and 1B are cross sectional views, from different directions, of an exemplary molding apparatus in accordance with a first embodiment of the invention.
Figure 1B:
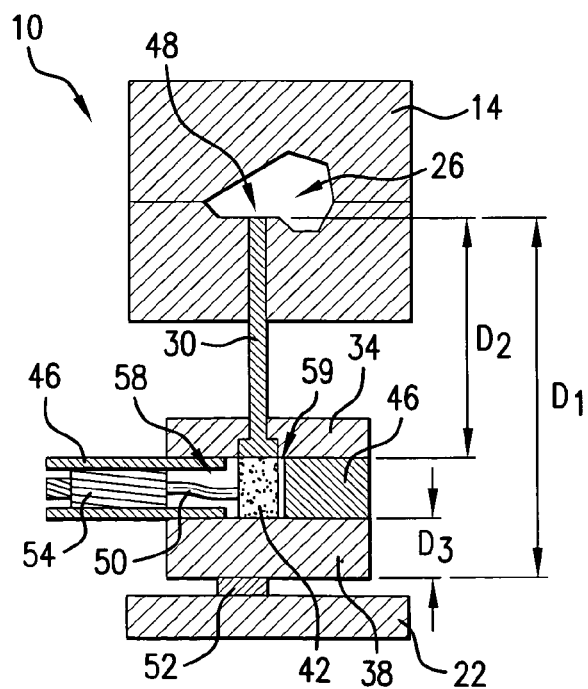

Referring now to FIGS. 1A and 1B an exemplary molding apparatus 10, in accordance with a first embodiment of the invention, is shown. The molding apparatus 10 is capable of indirectly measuring cavity pressure. Cross sections of the molding apparatus 10, each from a different direction, are shown in FIGS. 1A and 1B, respectively. Referring particularly to FIG. 1A, the molding apparatus 10 comprises an A side 14 and a B side 18. The A side 14 and B side 18 are held in a press, not shown. The press is capable of forcing and holding the A side 14 and B side 18 together under pressure and, subsequently, of opening the molding die by forcing the A side 14 and B side 18 apart. The press mechanically couples to the sides 14 and 18 and to the die structure 12 to perform operations requiring movement of the components and application of pressure. In addition, the press conducts incoming liquid resin material and coolant or heating media to the sides 14 and 18 and allows trapped air to escape during cavity fill. The molding apparatus 10 also includes a plurality of ejector pins 30, a retainer plate 34, and an ejector plate 38, as described above.

As an important feature of this embodiment, a plurality of sensors 42 are held between the ejector pins 30 and the ejector plate 38. Each ejector pin 30 has a first surface 48 and a second surface 50. The first surface 48 is exposed to the mold cavity 26 formed by the A and B sides 14 and 18. The second surface 50 is placed into direct contact with the sensor 42. Each sensor 42 entirely supports the weight of the ejector pin 30 so that any force exerted onto the first surface 48 of the ejector pin 30 is transferred through the ejector pin 30 to the sensor 42. The sensor 42 is supported from behind by the ejector plate 38. Therefore, the sensor 42 sustains (and therefore can measure) the same force exerted onto the first surface 48 of the ejector pin 30. The sensor 42 may have a nub, not shown, onto which the full weight of the ejector pin 30 rests.

The sensor 42 preferably converts the applied pressure into an electrical signal. For example, the sensor 42 may respond to changes in applied pressure by outputting a differential voltage between its electrical outputs. Alternatively, the sensor 42 may respond to changes in the applied pressure by altering the electrical resistance between its outputs. In either case, the change in pressure is detectable using a standard electrical measurement apparatus. The variation in pressure is useful, for example, in detecting a flow front of liquid resin as it fills the mold cavity 26.

To facilitate installation of the sensors 42, a novel spacer plate 46 is placed between the retainer plate 34 and the ejector plate 38. The spacer plate 46 must be at least as thick as the sensor 42. Referring particularly to FIG. 1B, routing channels 58 and clearance holes 59 are cut in the spacer plate 46. Preferably, the sensors 42 are placed in clearance holes in the spacer plate 46 such that the sensors 42 will bear the full weight of the ejector pins 30. Preferably, the spacer plate 46 is thick enough to allow signal conductors 50 and signal conditioning circuits 54 to be embedded within the spacer plate 46. As a result, the novel spacer plate 46 facilitates sensor insertion, cable routing, and instrumentation of a measurement system. The system can be used for initial set-up and optimization of the molding apparatus or for later trouble-shooting. The system may be easily installed and uninstalled. Most importantly, the sensor 42 installation does not require modification of the A side 14, the B side 18, the ejector plate 34, or the retainer plate 38.

The spacer plate 46 of the first embodiment shortens the available distance for ejector pin 30 operation. The molding apparatus 10 provides a distance $D_1$ between the top of the clamping plate 22 and the first surface 48 of the ejector pin 30 exposed in the cavity 26. Without the spacer plate 46, the available distance $D_1$ is divided between the ejector pin length $D_2$, the thickness $D_3$ of the ejector plate 38, and the height of the ejector stop pins 52. However, the inclusion of the spacer plate 46 and sensors 42 reduces the available distance $D_1$ so that either the ejector pin 30 length $D_2$ or the ejector plate 38 thickness $D_3$ must be reduced. If the length of the ejector pins 30 is reduced, then the length of return pins, not shown, must also be reduced. If this is unacceptable, then the mold may be equipped with ejector rail spacers, not shown, of the same thickness as the installed spacer plate 46. However, support pillars, dowels, and bolts would then have to be lengthened to maintain the integrity of the molding apparatus 10.

Alternatively, if the ejector plate 38 is made thinner to account for the spacer plate 46, then the ejector pins 30 may be left unchanged. Since the ejector pins 30 are often custom fabricated with the molding die, it is often better to not alter or replace them. A generic ejector plate 38, of reduced thickness, is simply substituted for the production ejector plate 38. For new molding dies, two ejector plates 38—one thick and one thin—may be fabricated to facilitate later installation of the sensors 42 and spacer plate 46.

Figure 2A:
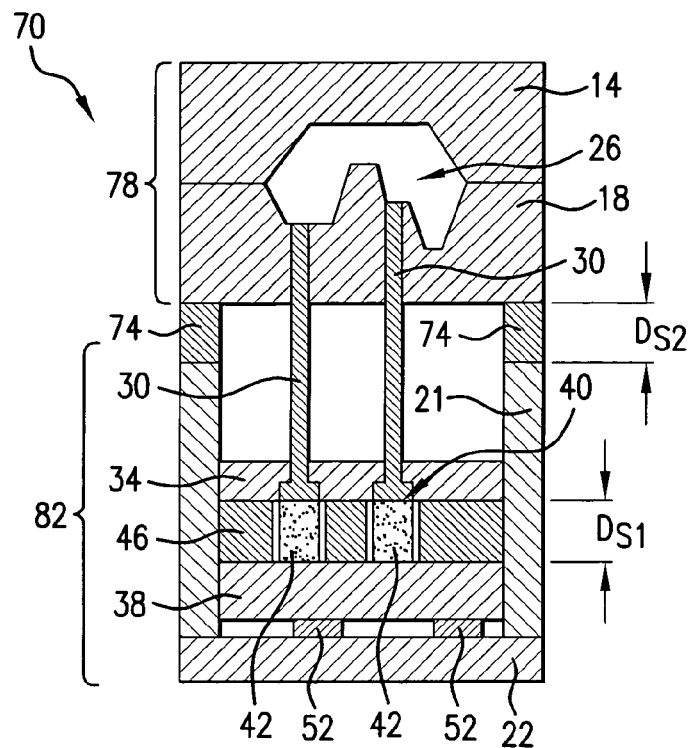
FIGS. 2A and 2B are cross sectional views, from different directions, of an exemplary molding apparatus in accordance a second embodiment of the invention.
Figure 2B:
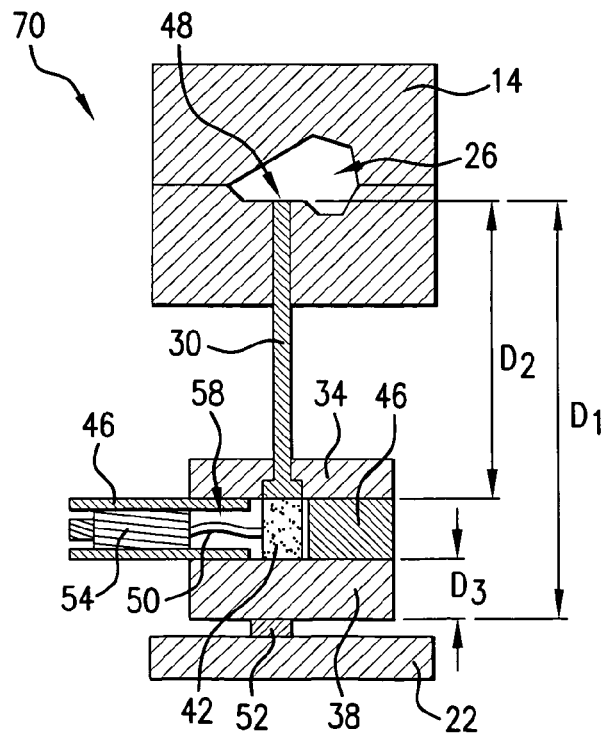

Referring now to FIGS. 2A and 2B, an exemplary molding apparatus 70, in accordance with a second embodiment of the invention, is shown in alternative cross sections. In this embodiment, neither the ejector pins 30 nor the ejector plate 38 is replaced or reduced in length or thickness. Instead, a die spacing plate 74 is added. The molding apparatus 70 may be conceptually divided between a first portion 78, including the A and B sides 14 and 18, and a second portion 82, including the remaining die side frame 21, clamping plate 22, retainer plate 34, ejector pins 30, ejector plate 38, and ejector stop pins 58. The die spacing plate 74 is installed between the first and second portions 78 and 82. The thickness $D_{S2}$ of the die spacing plate 74 is matched to the thickness $D_{S1}$ of the spacer plate 46. The presence of the die spacing plate 74 increases the available distance $D_1$ between the first surface 48 of the ejector pin 30 and the bottom surface of the ejector plate 38. This increased available distance $D_1$ compensates for the presence of the sensor plate 46. Therefore, the ejector pins 30 and ejector plate 38 do not have to be altered. This embodiment is particularly advantageous where a contractual agreement does not allow alteration of the ejector pins 30 or ejector plate 38. Further, since no components are replaced, all measurements are taken on the production system.

Figures 3A, 3B:
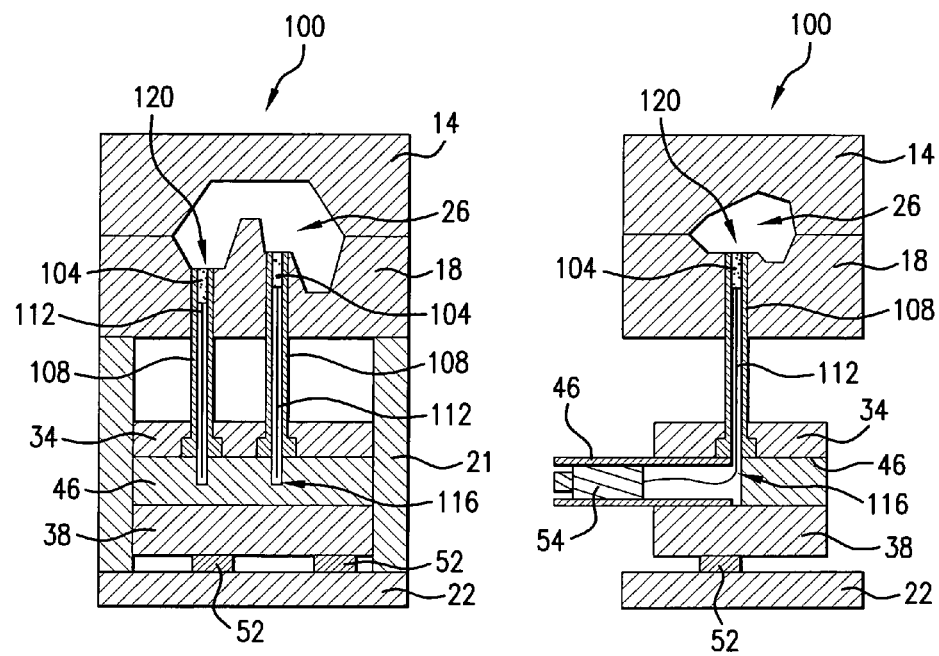
FIGS. 3A and 3B are cross sectional views, from different directions, of an exemplary molding apparatus in accordance with a third embodiment of the invention.

Referring now to FIGS. 3A and 3B, an exemplary molding apparatus 100, in accordance with a third embodiment of the invention, is shown in alternative cross sections. In this embodiment, a molding cavity parameter, such as pressure and temperature, is directly measureable. A sensor 104 is mounted in a hollow ejector pin 108. The hollow ejector pin 108 has a first end facing the mold cavity 26. The second end of the hollow ejector pin 108 is held in the retainer plate 34. The sensor 104 is embedded in the first end of the hollow ejector pin 108 such that the sensor 104 is directly exposed to the mold cavity 26. The sensor signal line 112 is routed through the hollow ejector pin 108. The sensor 104 is preferably flush mounted to the end of the hollow ejector pin 108. As such, the sensor 104 is exposed directly to conditions in the mold cavity 26, yet does not affect the surface features of molded articles. The sensor 104 is preferably but not necessarily press fit into the first end of the hollow ejector pin 108.

In one embodiment, the sensor 104 is a pressure sensor. In another embodiment, the sensor 104 is a temperature sensor. The sensor 104 preferably converts the applied pressure or temperature into an electrical signal. For example, the sensor 104 may respond to changes in applied pressure or temperature by outputting a differential voltage between its electrical outputs. Alternatively, the sensor 104 may respond to changes in the applied pressure or temperature by altering the electrical resistance between its outputs. In either case, the change in pressure or temperature is detectable using a standard electrical measurement apparatus. The variation in pressure or temperature is useful, for example, in detecting a flow front of liquid resin as it fills the mold cavity 26. The sensor 104 is directly exposed to the molding material as it flows into, packs, and cools within the mold cavity 26. In addition, the sensor 104 can read the ambient mold cavity temperature or pressure as the molding material flows into, but is not yet in contact with the sensor 104. Therefore, the direct measurement sensor 104 is perfectly placed to provide significant data for the analysis and optimization of processing parameters.

To facilitate instrumentation of the sensors 104 without permanently altering the molding apparatus 100, a spacer plate 46 is placed between the retainer plate 34 and the ejector plate 38. The spacer plate 46 provides a space for the egress of the sensor signal line 112. Referring particularly to FIG. 3B, routing channels 116 are cut in the spacing plate 46. Preferably, the spacer plate 46 is thick enough to allow signal conditioning circuits 54 to be embedded within or on the surface of the spacer plate 46. As a result, the novel spacer plate 46 facilitates routing and protecting measurement instrumentation. The system can be used for initial set-up and optimization of the molding apparatus or for later troubleshooting. The system may be easily installed and uninstalled. Most importantly, the sensor 104 installation does not require modification of the A side 14, the B side 18, the ejector plate 34, or the retainer plate 38. Further, the hollow ejector pin 108 may be used to eject parts during actual molding cycles, at least in small quantities, such that the sensed data is representative of true process conditions.

Figure 4:
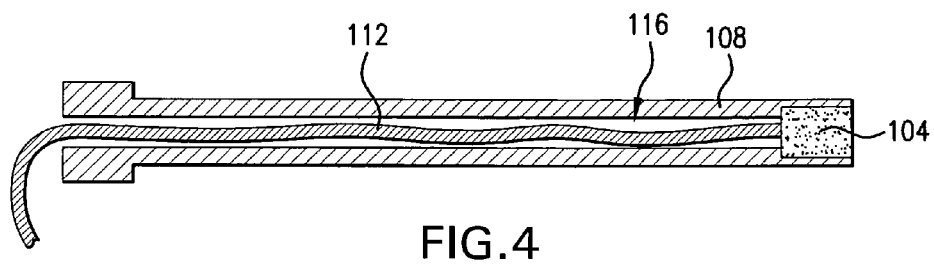
FIGS. 4 and 5 are cross sectional views, from different directions, of a hollow ejector pin in accordance with a fourth embodiment of the invention.
Figure 5:
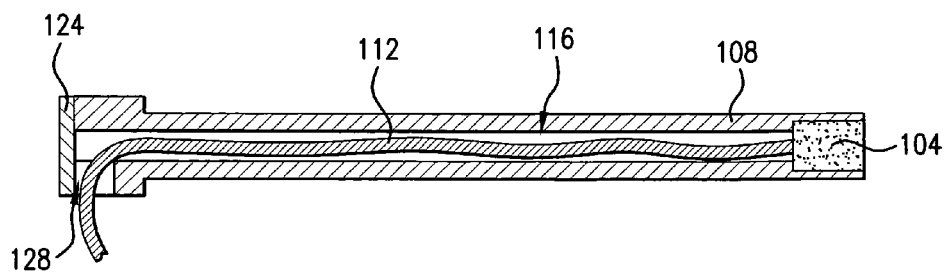

Referring now to FIGS. 4 and 5, an exemplary hollow ejector pin 108, in accordance with a fourth embodiment of the invention, is shown in cross section. Referring particularly, to FIG. 4, the hollow ejector pin 108 includes a sensor 104 embedded into one end. Where the hollow ejector pin 108 is an ejector pin sleeve, it may be necessary to machine one end to accommodate the sensor 104 shape. Preferably, the sensor 104 is press fit into the hollow ejector pin 108. The sensor signal conductor 112, typically an insulated metal wire or wire pair, is routed through the hollow ejector pin 108 and exits the second end. However, in some applications, it is preferable to route the signal 112 through the side of the hollow ejector pin 108. This is particularly true where assembly of the mold apparatus 100 may subject the signal line 112 to stress or breakage. Referring particularly to FIG. 5, a hole 128 is formed in the side of the hollow ejector pin 108. The signal line 112 is routed through the side hole 128, while a cap 124 is attached to the end of the hollow ejector pin 108. The cap 124 protects the signal line 112 from damage while providing additional structural support for the hollow ejector pin 108.

Figure 6A:
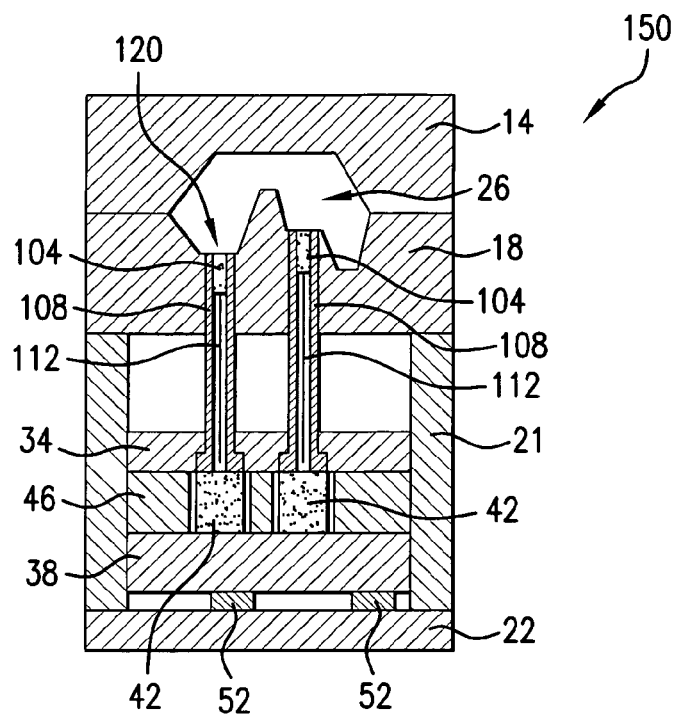
FIGS. 6A and 6B are cross sectional views, from different directions, of an exemplary molding apparatus in accordance with a fifth embodiment of the invention.
Figure 6B:
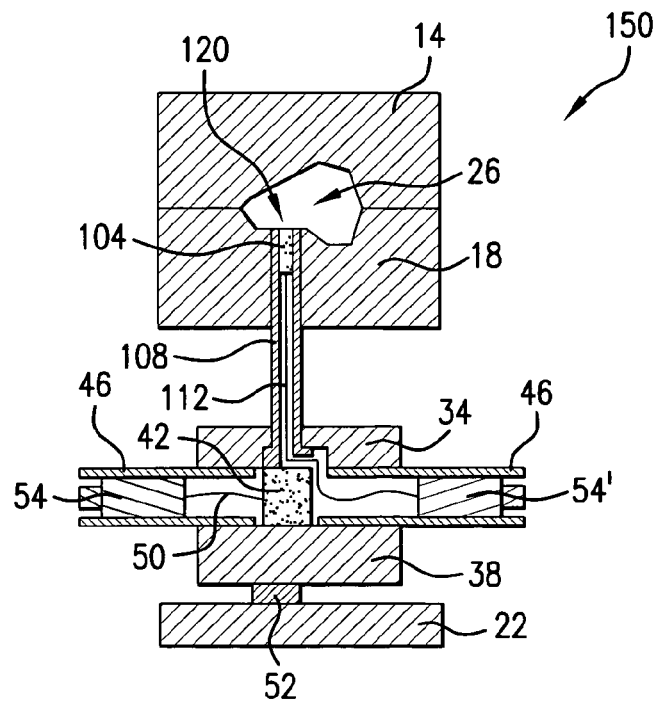

Referring now to FIGS. 6A and 6B, an exemplary molding apparatus 150, in accordance with a fifth embodiment of the invention, is shown in alternative cross sections. This embodiment combines direct measurement and indirect measurement of molding parameters. A direct sensor 104, such as for pressure or temperature, is embedded in one end of a hollow ejector pin 108. An indirect pressure sensor 42 supports the other end of the hollow ejector pin 108. The combined direct and indirect sensing configuration allows a single point measurement of both direct temperature and indirect pressure. Alternatively, direct pressure and indirect pressure may be measured at the same ejector pin location. Measurement of direct and indirect pressure at a single location is useful for correlation and calibration of indirect pressure measurements. Following such correlation, the hollow ejector pin 108 and direct sensor 104 may be replaced with a standard, solid ejector pin while retaining the indirect pressure sensor 42. The spacer plate 46 provides a space for embedding a signal conditioning circuit 54 for the indirect pressure sensor 42 and a signal conditioning circuit 54' for the direct sensor 104.

Figure 7A:
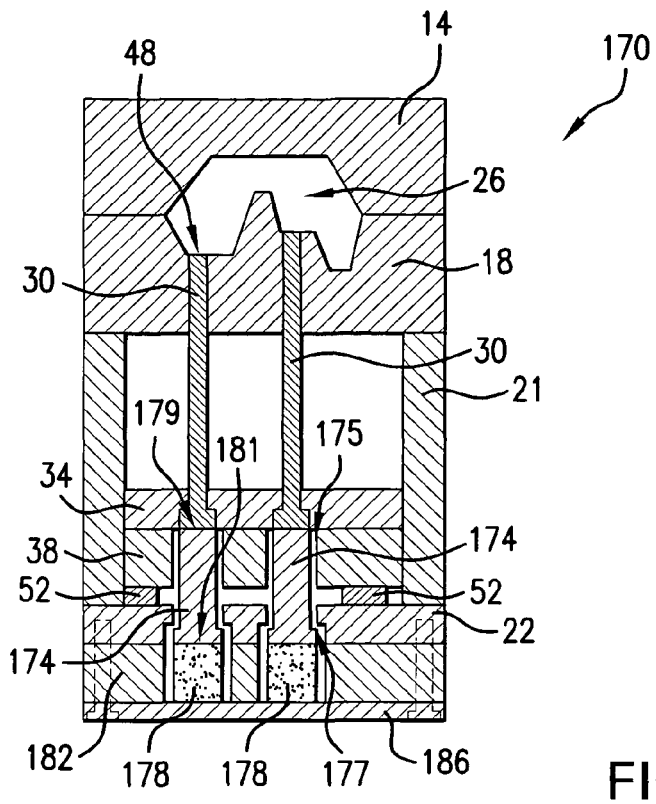
FIGS. 7A and 7B are cross sectional views, from different directions, of an exemplary molding apparatus in accordance with a sixth embodiment of the invention.
Figure 7B:
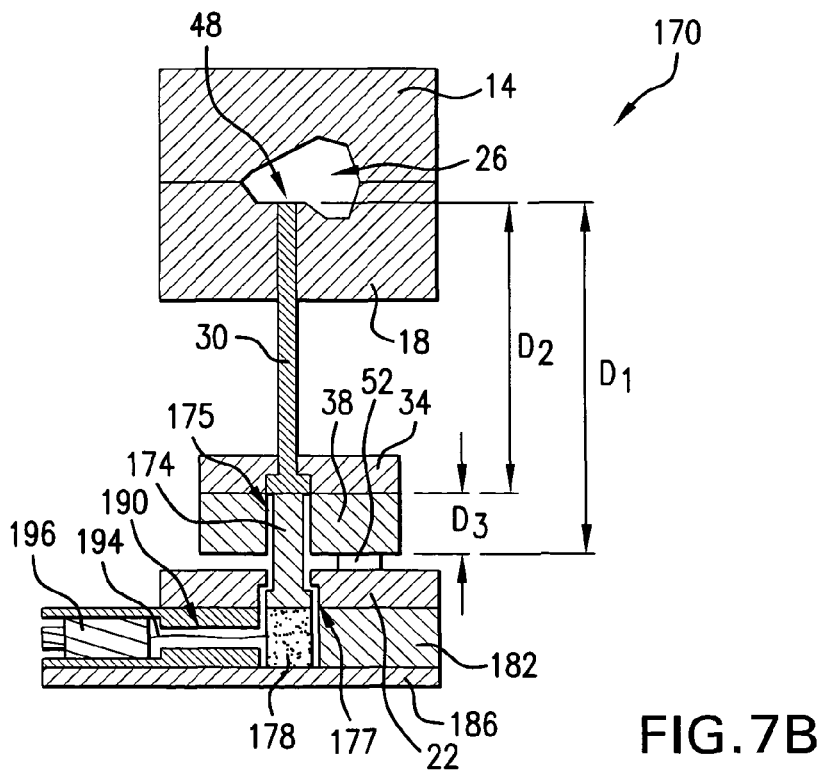

Referring now to FIGS. 7A and 7B, an exemplary molding apparatus 170, in accordance with a sixth embodiment of the invention, is shown in alternative cross sections. In this embodiment, an indirect sensing capability is again added to the molding apparatus 170. However, the sensors 178 and spacer plate 182 are added onto the outside of the molding apparatus 170. Clearance holes 175 are formed through the ejector plate 38 beneath (or behind) the ejector pins 30. The ejector plate clearance holes 175 expose the second surfaces of the ejector pins 30. Clearance holes 177 are also formed through clamping plate 122 concentric to the ejector plate clearance holes 175.

Transfer pins 174 are installed in the clearance holes 175 and 177. A first surface 179 of each transfer pin 174 contacts the second surface of each ejector pin 30. The transfer pins 174 extend from the ejector pins 30 to the sensors 178. Each sensor 178 entirely supports the weight of a transfer pin 174 and ejector pin 30 so that any force exerted onto the first surface 48 of the ejector pin 30 is transferred through the ejector pin 30 and transfer pin 174 to the sensor 178. The sensor 178 is supported from behind by a cover plate 186. Therefore, the sensor 178 sustains (and therefore can measure) the same force exerted onto the first surface 48 of the ejector pin 30. The sensor 178 may have a nub, not shown, onto which the full weight of the transfer pin 174 rests.

The sensor 178 preferably converts the applied pressure into an electrical signal. For example, the sensor 178 may respond to changes in applied pressure by outputting a differential voltage between its electrical outputs. Alternatively, the sensor 178 may respond to changes in the applied pressure by altering the electrical resistance between its outputs. In either case, the change in pressure is detectable using a standard electrical measurement apparatus. The variation in pressure is useful, for example, in detecting a flow front of liquid resin as it fills the mold cavity 26.

To facilitate installation of the sensors 178, a novel spacer plate 182 is placed between the clamping plate 22 and the cover plate 186. The spacer plate 178 must be at least as thick as the sensors 178. Referring particularly to FIG. 7B, routing channels 190 and clearance holes 177 are cut in the spacer plate 182. Preferably, the sensors 178 are placed in clearance holes in the spacer plate 182 such that the sensors 178 will bear the full weight from the transfer pins 174. Preferably, the spacer plate 178 is thick enough to allow signal conductors 194 and signal conditioning circuits 196 to be embedded within the spacer plate 182. As a result, the novel spacer plate 182 facilitates sensor insertion, cable routing, and instrumentation of a measurement system. The system can be used for initial set-up and optimization of the molding apparatus or for later trouble-shooting. The system may be easily installed and uninstalled. This embodiment advantageously allows easy access to the sensors 178 for replacement, servicing, and calibration without disassembling the mold 170. On very large molds, this is a significant advantage. Most importantly, the sensor 178 installation does not require modification of the A side 14, the B side 18, the ejector pins 30, the ejector plate 34, or the retainer plate 38. As an alternative feature, sleeves may be added to ejector plate clearance holes 175.

Figure 8A:
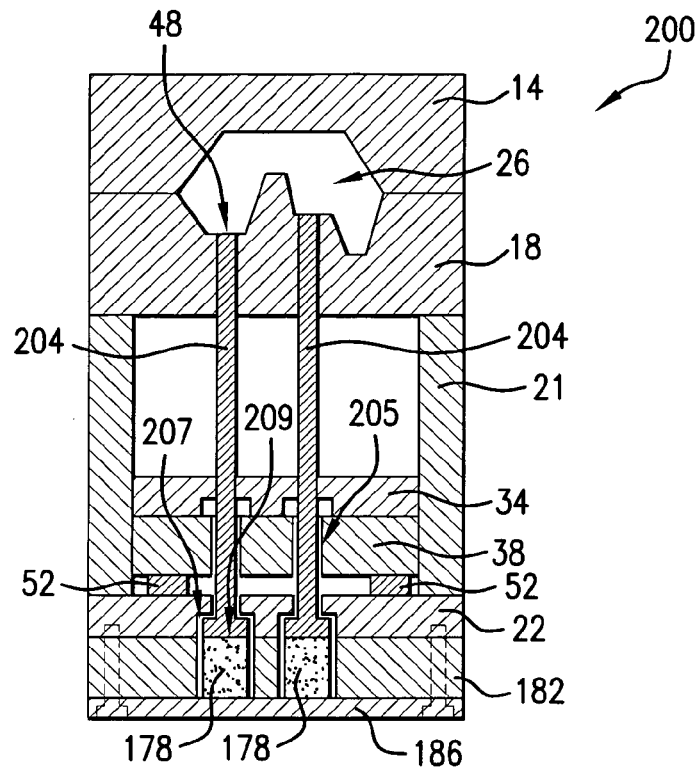
FIGS. 8A and 8B are cross sectional views, from different directions, of an exemplary molding apparatus in accordance with a seventh embodiment of the invention.
Figure 8B:
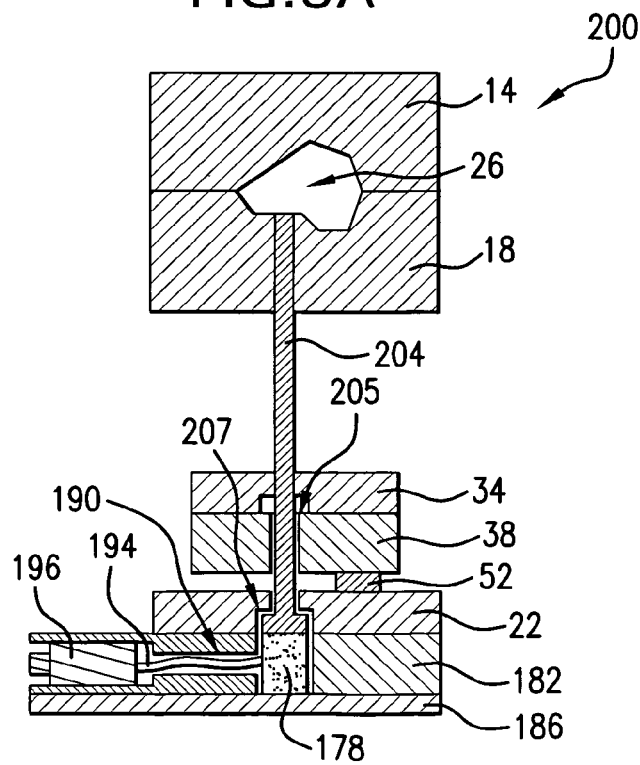

Referring now to FIGS. 8A and 8B, an exemplary molding apparatus 200, in accordance with a seventh embodiment of the invention, is shown in alternative cross sections. In this embodiment, an indirect sensing capability is provided to the molding apparatus 200 by adding sensors 178 and a spacer plate 182 onto the outside of the molding apparatus. However, in this embodiment, ejector pins are replaced with non-moving transfer pins 204. The ejector pins are removed from the molding apparatus 200. Clearance holes 205 are formed through the ejector plate 38 concentric to ejector pin holes in the retainer plate 34. Clearance holes 207 are also formed through clamping plate 22 concentric to the ejector plate clearance holes 205.

Transfer pins 204 are installed in the clearance holes 205 and 207. A first surface 48 of each transfer pin 204 is exposed to the mold cavity 26 through the ejector pin opening at the mold cavity 26. The transfer pins 204 extend to the sensors 178. A second surface 209 of the transfer pins 204 contacts each sensor 178. Each sensor 178 entirely supports the weight of a transfer pin 204 so that any force exerted onto the first surface 48 of the transfer pin 204 is transferred through the transfer pin 204 to the sensor 178. The sensor 178 is supported from behind by a cover plate 186. Therefore, the sensor 178 sustains (and therefore can measure) the same force exerted onto the first surface 48 of the transfer pin 204. The sensor 178 may have a nub, not shown, onto which the full weight of the transfer pin 204 rests.

The sensor 178 preferably converts the applied pressure into an electrical signal. For example, the sensor 178 may respond to changes in applied pressure by outputting a differential voltage between its electrical outputs. Alternatively, the sensor 178 may respond to changes in the applied pressure by altering the electrical resistance between its outputs. In either case, the change in pressure is detectable using a standard electrical measurement apparatus. The variation in pressure is useful, for example, in detecting a flow front of liquid resin as it fills the mold cavity 26.

To facilitate installation of the sensors 178, a novel spacer plate 182 is placed between the clamping plate 22 and the cover plate 186. The spacer plate 182 must be at least as thick as the sensors 178. Referring particularly to FIG. 8B, routing channels 190 are cut in the spacer plate 182. Preferably, the sensors 178 are placed in clearance holes in the spacer plate 182 such that the sensors 178 will bear the full weight from the transfer pins 204. Preferably, the spacer plate 182 is thick enough to allow signal conductors 194 and signal conditioning circuits 196 to be embedded within the spacer plate 182. As a result, the novel spacer plate 182 facilitates sensor insertion, cable routing, and instrumentation of a measurement system. The system can be used for initial set-up and optimization of the molding apparatus or for later trouble-shooting. The system may be easily installed and uninstalled. The embodiment allows a preexisting ejector pin location to be used for indirect pressure measurement. The transfer pins can also be installed in a non ejecting pin hole not designed for ejection which is present in either cavity block. Alternatively, a non ejecting transfer pin can be added expressly for sensing if allowed by the molding agreement.

Figure 9A:
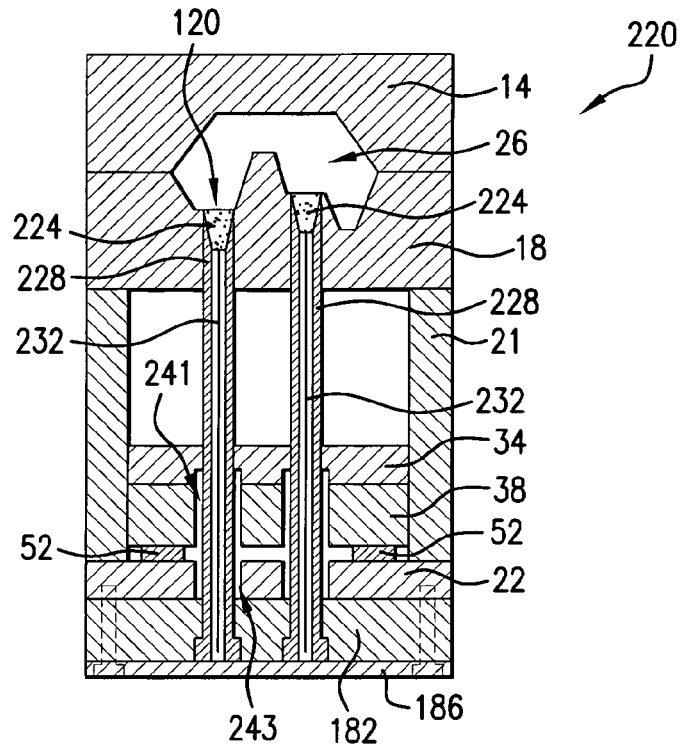
FIGS. 9A and 9B are cross sectional views, from different directions, of an exemplary molding apparatus in accordance with a eighth embodiment of the invention.
Figure 9B:
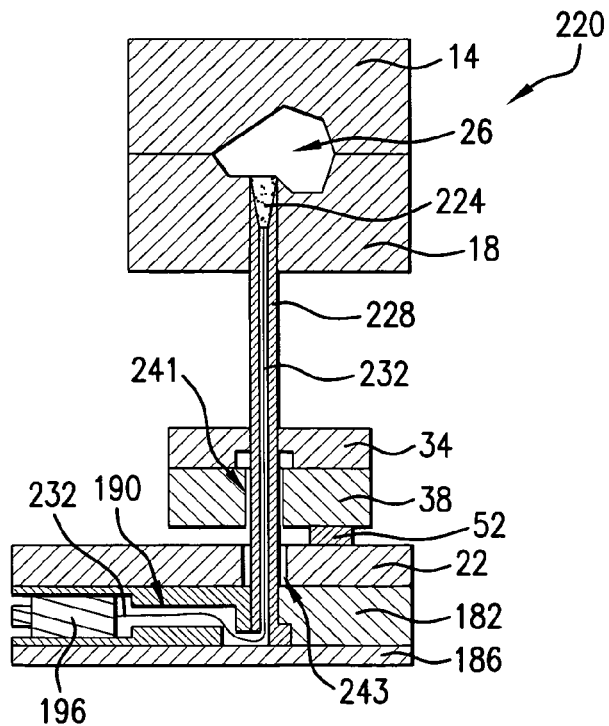

Referring now to FIGS. 9A and 9B, an exemplary molding apparatus 220, in accordance with a eighth embodiment of the invention, is shown in alternative cross sections. In this embodiment, a direct sensing capability is provided to the molding apparatus 220 by replacing ejector pins with non-moving transfer pins 228. However, direct sensors 224 are embedded into hollow transfer pins 228. Each sensor 224 is mounted in a hollow transfer pin 228. The hollow transfer pin 228 has a first end facing the mold cavity 26. The sensor 224 is embedded in the first end of the hollow transfer pin 228 such that the sensor 224 is directly exposed to the mold cavity 26. The sensor signal line 232 is routed through the hollow transfer pin 228. The sensor 224 is preferably flush mounted to the end of the hollow ejector pin 228. As such, the sensor 224 is exposed directly to conditions in the mold cavity 26 without affecting the surface features of molded articles. The sensor 224 is preferably press fit into the first end of the hollow transfer pin 228. The ejector pins are removed from the molding apparatus 220. Clearance holes 241 are formed through the ejector plate 38 concentric to ejector pin holes in the retainer plate 34. Clearance holes 243 are also formed through the clamping plate 22 concentric to the ejector plate clearance holes 241. Hollow transfer pins 228 are installed in the clearance holes 241 and 243.

In one embodiment, the sensor 224 is a pressure sensor. In another embodiment, the sensor 224 is a temperature sensor. The sensor 224 preferably converts the applied pressure or temperature into an electrical signal. For example, the sensor 224 may respond to changes in applied pressure or temperature by outputting a differential voltage between its electrical outputs. Alternatively, the sensor 224 may respond to changes in the applied pressure or temperature by altering the electrical resistance between its outputs. In either case, the change in pressure or temperature is detectable using a standard electrical measurement apparatus. The variation in pressure or temperature is useful, for example, in detecting a flow front of liquid resin as it fills the mold cavity 26. The sensor 224 is directly exposed to the molding material as it flows into, packs, and cools within the mold cavity 26. In addition, the sensor 224 can read the ambient mold cavity temperature or pressure as the molding material flows into, but is not yet in contact with the sensor 224. Therefore, the direct measurement sensor 224 is perfectly placed to provide significant data for the analysis and optimization of processing parameters.

To facilitate instrumentation of the sensors 224 without permanently altering the molding apparatus 220, a spacer plate 182 is placed between the clamping plate 22 and a cover plate 186. The spacer plate 182 provides a space for the egress of the sensor signal line 232. Referring particularly to FIG. 9B, routing channels 190 are cut in the spacing plate 182. Preferably, the spacer plate 182 is thick enough to allow signal conditioning circuits 196 to be embedded within the spacer plate 182. As a result, the novel spacer plate 182 facilitates routing and protecting measurement instrumentation. The system can be used for initial set-up and optimization of the molding apparatus or for later trouble-shooting. The system may be easily installed and uninstalled.

Figure 10A:
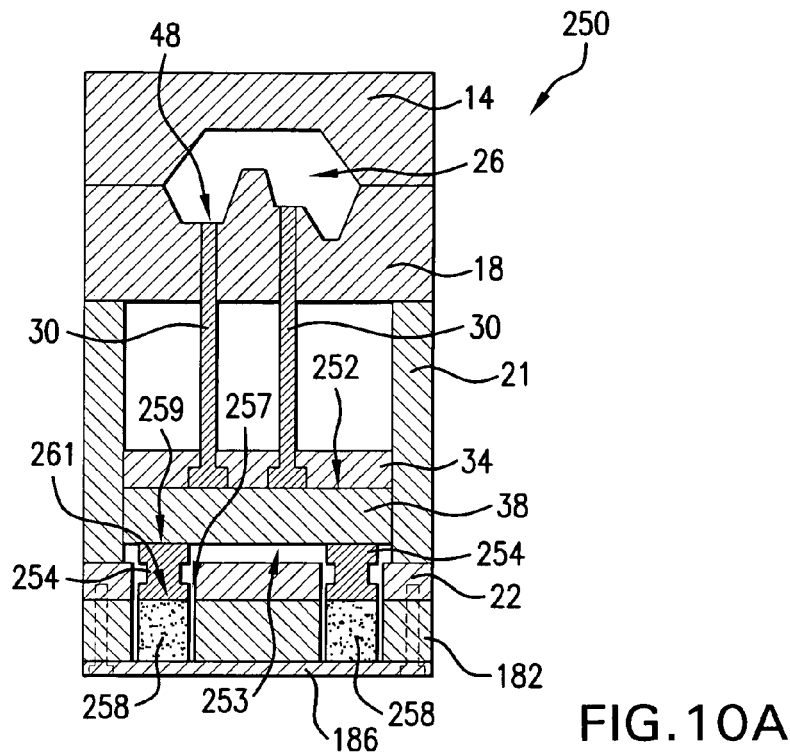
FIGS. 10A and 10B are cross sectional views, from different directions, of an exemplary molding apparatus in accordance with a ninth embodiment of the invention.
Figure 10B:
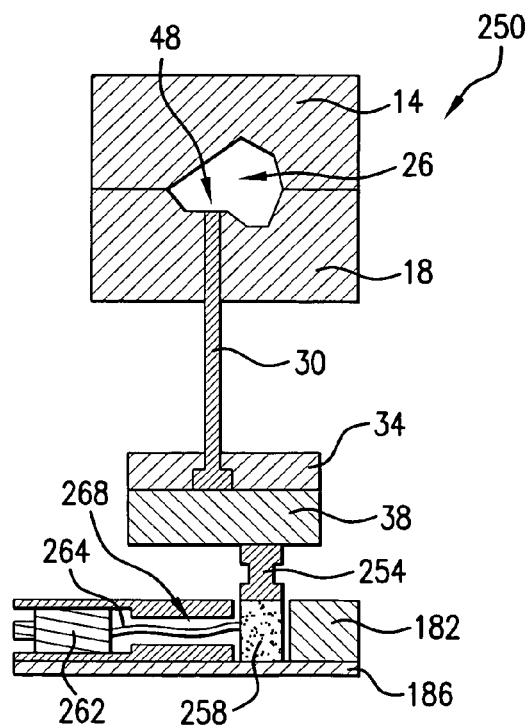
Figure 11A:
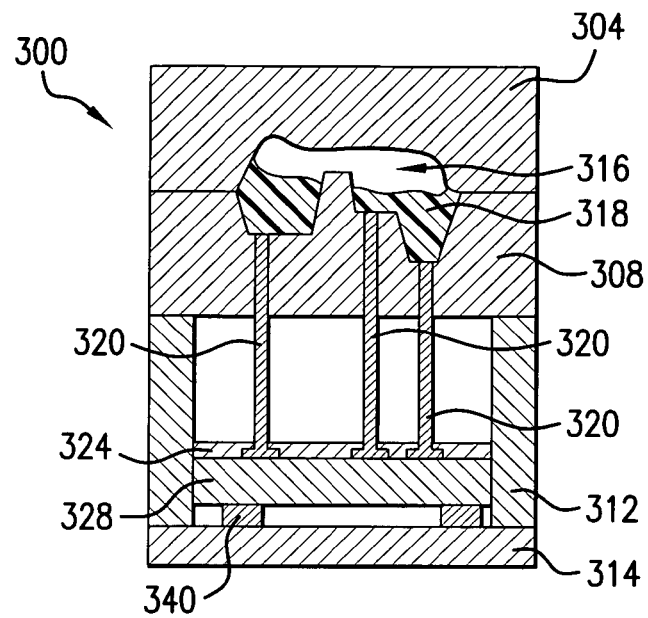
FIGS. 11A through 11D are cross sectional views of a prior art molding apparatus showing the operation of the apparatus.
Figure 11B:
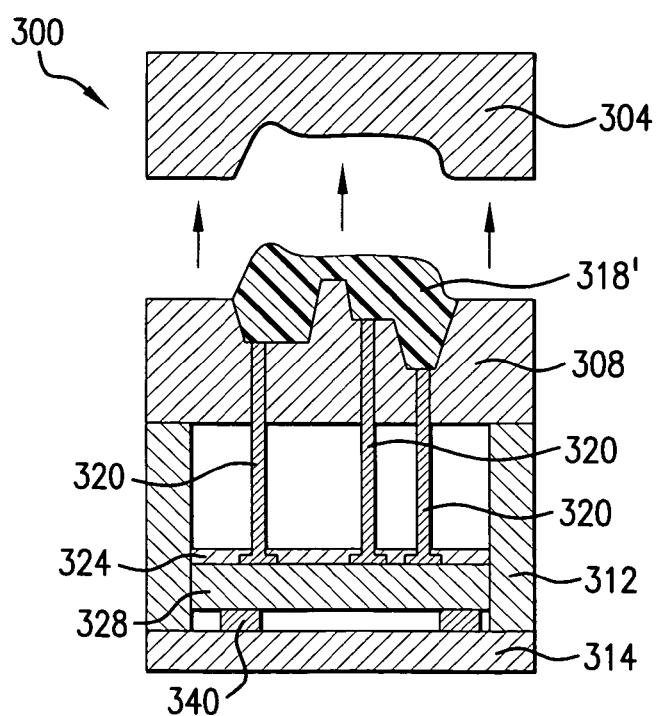
Figure 11C:
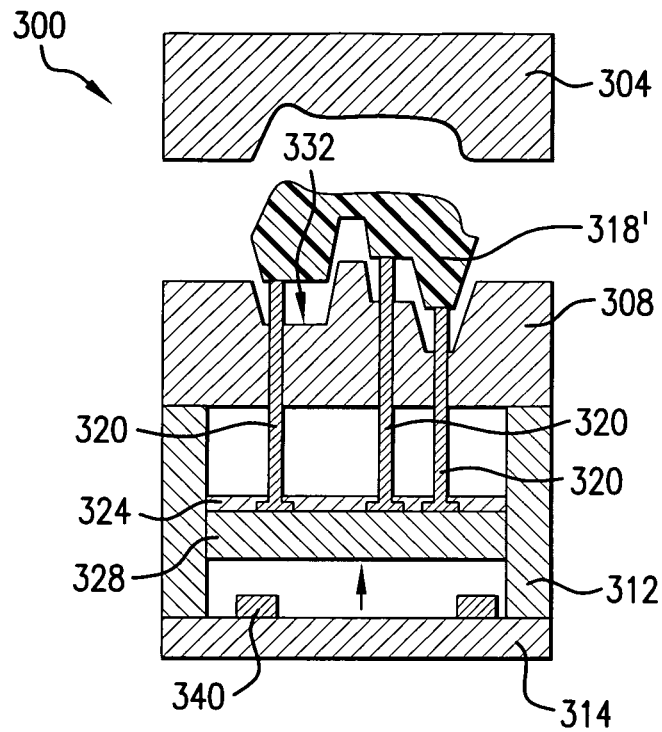
Figure 11D:
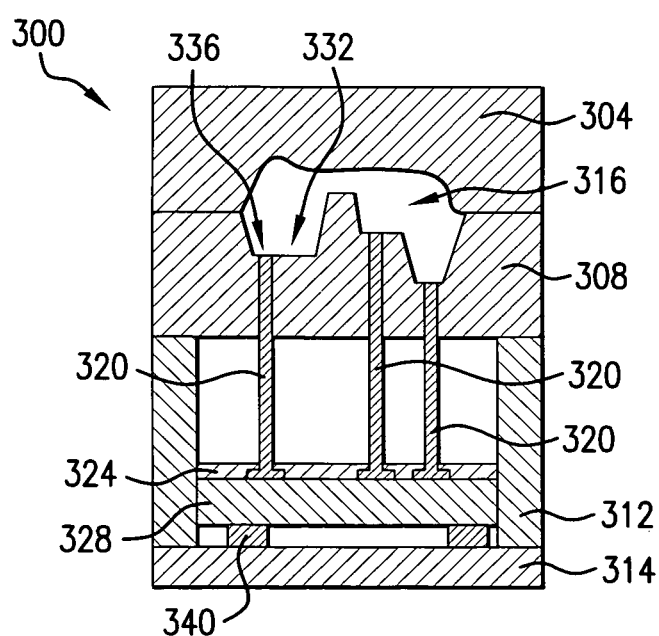

Referring now to FIGS. 10A and 10B, an exemplary molding apparatus 250, in accordance with a tenth embodiment of the invention, is shown in alternative cross sections. In this embodiment, an indirect sensing capability is provided to the molding apparatus 250 by adding sensors 258 and a spacer plate 182 onto the outside of the molding apparatus. In this embodiment, ejector stop pins are replaced with transfer pins 254. The ejector stop pins are removed from the molding apparatus 250. Clearance holes 257 are formed through the clamping plate 22 concentric to the ejector stop pin locations. Transfer pins 254 are installed through the clearance holes 257. A first end 259 of each transfer pin 254 contacts the ejector plate 38. The transfer pins 254 extend to the sensors 258. A second end 261 of each transfer pin 254 contacts each sensor 258. Each sensor 258 entirely supports the weight of a transfer pin 254 so that any force exerted onto the first surface 259 of the transfer pin 254 is transferred through the transfer pin 254 to the sensor 258. The sensor 258 is supported from behind by a cover plate 186. Therefore, the sensor 258 sustains (and therefore can measure) the same force exerted onto the first surface 259 of the transfer pin 254. The sensor 258 may have a nub, not shown, onto which the full weight of the transfer pin 254 rests. Alternatively, the ejector stop pins may be replaced with sensors, but without transfer pins traversing to the clamping plate.

The sensor 258 preferably converts the applied pressure into an electrical signal. For example, the sensor 258 may respond to changes in applied pressure by outputting a differential voltage between its electrical outputs. Alternatively, the sensor 258 may respond to changes in the applied pressure by altering the electrical resistance between its outputs. In either case, the change in pressure is detectable using a standard electrical measurement apparatus. The pressure of mold cavity 26 may be indirectly measured. When the ejector plate 38 is in the retracted position, all of the pressure sensors 258 are measured. The total force exerted on the entire group of transfer pins 254 is found by summing together the signals from all of the sensors 258. In addition, at any given time, the signals from each sensor 258 reveal a relative pressure gradient across mold as transferred through the transfer pins 254. By capturing these sensor outputs, a time-variant, pressure gradient is revealed across the mold cavity 26 (or molding cavities in a multiple cavity die). This pressure gradient may be analyzed for repeatability.

To facilitate installation of the sensors 258, a novel spacer plate 182 is placed between the clamping plate 22 and the cover plate 186. The spacer plate 182 must be at least as thick as the sensors 258. Referring particularly to FIG. 8B, routing channels 268 and clearance holes are cut in the spacer plate 182. Preferably, the spacer plate 182 is thick enough to allow signal conductors 264 and signal conditioning circuits 262 to be embedded within the spacer plate 182. As a result, the novel spacer plate 182 facilitates sensor insertion, cable routing, and instrumentation of a measurement system. The system can be used for initial set-up and optimization of the molding apparatus or for later trouble-shooting. The system may be easily installed and uninstalled. The embodiment allows a preexisting ejector stop pin location to be used for indirect pressure measurement.

The above detailed description of the invention, and the examples described therein, has been presented for the purposes of illustration and description. While the principles of the invention have been described above in connection with a specific device, it is to be clearly understood that this description is made only by way of example and not as a limitation on the scope of the invention.

What is claimed is:

1. A molding apparatus comprising:
    a mold cavity;
    a retainer plate;
    an ejector plate;
    a spacer plate fixably held between said retainer plate and said ejector plate;
    an ejector pin having a first surface exposed to said mold cavity and a second surface not exposed to said mold cavity; and
    a sensor in communicative contact with said ejector pin second surface, wherein said sensor is operable to sense mold cavity pressure through said ejector pin.

2. The molding apparatus of claim 1 further comprising:
    said retainer plate holding one end of said ejector pin; and
    an ejector plate operable to force said ejector pin into said mold cavity wherein said sensor is fixably held between said ejector pin second surface and said ejector plate.

3. The molding apparatus of claim 2 further comprising a signal conditioning circuit embedded within or onto said spacer plate and electrically coupled to said sensor.

4. The molding apparatus of claim 2 wherein said molding apparatus further comprises:
    a first portion containing said molding cavity;
    a second portion containing said ejector plate; and
    a die spacing plate between said first and second portions to account for the thickness of said spacer plate.

5. The molding apparatus of claim 1 further comprising:
said ejector plate operable to force said ejector pin into said mold cavity, wherein said ejector plate has a clearance hole that exposes said ejector pin second surface;
a clamping plate having a clearance hole concentric to said ejector plate clearance hole;
a transfer pin through said ejector plate and clamping plate clearance holes wherein a first surface of said transfer pin is in communicative contact with said ejector pin second surface; and
a cover plate wherein said sensor is held between said cover plate and a second surface of said transfer pin.

6. The molding apparatus of claim 5 further comprising a sleeve lining said ejector plate clearance hole or said clamping plate clearance hole.

7. The molding apparatus of claim 5 further comprising a spacer plate fixably held between said cover plate and said clamping plate.

8. The molding apparatus of claim 7 further comprising a signal conditioning circuit embedded within or mounted onto the surface of said spacer plate and electrically coupled to said sensor.

9. A molding apparatus comprising:
a mold cavity;
a retainer plate;
an ejector plate;
a spacer plate fixably held between said retainer plate and said ejector plate;
a hollow ejector pin having a first end facing said mold cavity and a second end not facing said mold cavity; and
a sensor embedded in said hollow ejector pin first end, wherein said sensor is exposed to said mold cavity and wherein said sensor has a signal line routed through said hollow ejector pin, wherein said sensor is operable to sense a mold cavity parameter.

10. The molding apparatus of claim 9 further comprising:
a retainer plate holding one end of said hollow ejector pin; and
said ejector plate operable to force said hollow ejector pin into said mold cavity.

11. The molding apparatus of claim 10 further comprising a signal conditioning circuit embedded within or onto said spacer plate and electrically coupled to said sensor signal line.

12. The molding apparatus of claim 10 wherein the molding apparatus further comprises:
a first portion containing said molding cavity;
a second portion containing said ejector plate; and
a die spacing plate between said first and second portions to account for said thickness of the spacer plate.

13. The molding apparatus of claim 10 wherein said molding apparatus further comprises a second sensor in communicative contact with said ejector pin second surface, wherein said second sensor is fixably held between said hollow ejector pin second surface and said ejector plate and wherein said second sensor is operable to sense mold cavity pressure through said ejector pin.

14. The molding apparatus of claim 13 further comprising a second signal conditioning circuit embedded within or mounted onto said spacer plate and electrically coupled to said second sensor.

15. A molding apparatus comprising:
a mold cavity having an opening for an ejector pin;
a cover plate;
a clamping plate;
a spacer plate fixably held between said cover plate and said clamping plate;
a retainer plate having at least one opening operable to hold said ejector pin;
said ejector plate having a clearance hole concentric to said retainer plate opening;
a clamping plate having a clearance hole concentric to said ejector plate opening;
a transfer pin through said retainer plate opening, said ejector plate clearance hole, and clamping plate clearance hole, wherein a first surface of said transfer pin is exposed to said mold cavity through said mold cavity ejector pin opening and a second surface of said transfer pin is not exposed to said mold cavity;
a sensor in communicative contact with said transfer pin second surface, wherein said sensor is operable to sense mold cavity pressure through said transfer pin; and
a cover plate wherein said sensor is fixably held between said cover plate and transfer plate second surface.

16. The molding apparatus of claim 15 further comprising a signal conditioning circuit embedded within or mounted onto said spacer plate and electrically coupled to said sensor.

17. A molding apparatus comprising:
a mold cavity having an opening for an ejector pin;
a cover plate;
a clamping plate;
a spacer plate fixably held between said cover plate and said clamping plate;
a retainer plate having at least one opening operable to hold said ejector pin;
said ejector plate having a clearance hole concentric to said retainer plate opening;
a clamping plate having a clearance hole concentric to said ejector plate opening;
a hollow transfer pin through said retainer plate opening, said ejector plate clearance hole, and said clamping plate clearance hole, wherein said hollow transfer pin has a first end facing said mold cavity and a second end not facing said mold cavity;
a sensor embedded in said hollow transfer pin first end, wherein said sensor is exposed to said mold cavity and wherein said sensor has a signal line routed through said hollow transfer pin, wherein said sensor is operable to sense a mold cavity parameter; and
a cover plate wherein said sensor is fixably held between said cover plate and said hollow transfer pin second end.

18. The molding apparatus of claim 17 further comprising a signal conditioning circuit embedded within or mounted onto said spacer plate and electrically coupled to said sensor signal line.

19. The molding apparatus of claim 17 wherein said the molding apparatus further comprises a second sensor in communicative contact with said hollow transfer pin second end, wherein said second sensor is fixably held between said hollow transfer pin second surface and said cover plate and wherein said second sensor is operable to sense mold cavity pressure through said hollow transfer pin.

20. The molding apparatus of claim 19 further comprising a second signal conditioning circuit embedded within said spacer plate and electrically coupled to said second sensor.

21. A molding apparatus comprising:
a cover plate;
a clamping plate;
a spacer plate fixably held between said cover plate and said clamping plate;
an ejector plate operable to force an ejector pin in a mold cavity, wherein said ejector plate has a first side facing said mold cavity and a second side not facing said mold cavity;
a transfer pin having a first end in communicative contact with said ejector plate second side, wherein said transfer pin is operable to stop said ejector plate;
said a clamping plate having a clearance hole, wherein said transfer pin is through said clamping plate;

a sensor in communicative contact with a second end of said transfer pin, wherein said sensor is operable to sense ejector plate pressure through said transfer pin; and wherein said sensor is fixably held between said cover plate and a second end of said transfer pin.

22. The molding apparatus of claim 21 further comprising a signal conditioning circuit embedded within or mounted onto said spacer plate and electrically coupled to said sensor.

23. The molding apparatus of claim 21 further comprising:

a second transfer pin having a first end in communicative contact with said ejector plate second side, wherein said second transfer pin is operable to stop said ejector plate; and a second sensor in communicative contact with a second end of said second transfer pin, wherein said second sensor is operable to sense ejector plate pressure through said second transfer pin.

24. The molding apparatus of claim 21 further comprising:

a spacer plate fixably held between said cover plate and said clamping plate; and a signal conditioning circuit embedded within or mounted onto said surface of said spacer plate and electrically coupled to said first and second sensor, wherein said signal conditioning circuit is operable to sum first and second sensor pressures.

* * * * *